United States Patent [19]

Goebel

[11] 4,355,085

[45] Oct. 19, 1982

[54] ELECTROCHEMICAL CELL

[75] Inventor: Franz Goebel, Sudbury, Mass.

[73] Assignee: GTE Products Corp., Stamford, Conn.

[21] Appl. No.: 286,212

[22] Filed: Jul. 23, 1981

[51] Int. Cl.$^3$ ............................................... H01M 2/26
[52] U.S. Cl. .................................... 429/101; 429/105; 429/161; 429/169; 429/218
[58] Field of Search ............... 429/101, 105, 163, 164, 429/128, 211, 218, 196, 161, 169

[56] References Cited

U.S. PATENT DOCUMENTS

| | | | |
|---|---|---|---|
| 3,116,172 | 12/1963 | Wilke et al. | 429/128 |
| 4,060,668 | 11/1977 | Goebel | 429/218 |
| 4,284,691 | 8/1981 | Goebel et al. | 429/105 |
| 4,317,869 | 3/1982 | Folus | 429/128 |

Primary Examiner—Donald L. Walton
Attorney, Agent, or Firm—Peter Xiarhos

[57] ABSTRACT

A primary electrochemical cell having a carbon current collector cathode structure of improved design. The electrochemical cell includes an elongated housing containing an electrolytic solution and a battery stack in contact with the electrolytic solution. The battery stack includes a concentric arrangement of an anode, a porous separator, and a carbon current collector cathode structure. The carbon current collector cathode structure in accordance with the invention includes an elongated cylindrical porous carbon element having a guide opening therein, and a unitary, tapered, generally V-shaped metal current collector element embedded within the porous carbon element. The current collector element includes first and second spaced-apart, elongated, tapered, generally arcuate, resilient spring members joined together at first ends thereby to define a tapered, conical opening therebetween for the receipt therein of electrolytic solution. The current collector element is forced into and embedded within the carbon element by way of the guide opening in the carbon element. When embedded into the carbon element, the spring members exert an outwardly directed force against internal portions of the carbon element and the other internal components of the cell.

13 Claims, 4 Drawing Figures

ELECTROCHEMICAL CELL

CROSS-REFERENCE TO RELATED APPLICATION

In co-pending application Ser. No. 286,217 filed concurrently herewith in the name of Franz Goebel, and entitled "METHOD FOR ASSEMBLING AN ELECTROCHEMICAL CELL", there is disclosed and claimed a method for assembling a carbon cathode structure for an electrochemical cell as disclosed and claimed in the present application.

BACKGROUND OF THE INVENTION

The present invention relates to an electrochemical cell and, more particularly, to a primary electrochemical cell having a carbon cathode structure of improved design.

Primary electrochemical cells are utilized for a wide variety of applications and are commonly available in a large assortment of sizes and shapes. Furthermore, a number of electrochemical systems are known for incorporation into such primary electrochemical cells. Many of these electrochemical cells utilize a carbon cathode structure. By way of example, in U.S. Pat. No. 4,060,668, in the name of Franz Goebel and assigned to GTE Laboratories Incorporated, there is disclosed an electrochemical system including an anode, a carbon current collector cathode structure, and an electrolytic solution in contact with the anode and the carbon current collector cathode structure. The carbon current collector cathode structure employed in this electrochemical system includes a preformed porous cylindrical carbon structure of a specified length (as determined by the size of the cell), and a twisted metal cathode current collector impressed into and along the carbon structure. One end of the twisted current collector, which protrudes out of the carbon structure, is welded to a feedthrough provided in a cover of the cell. The porous carbon structure comprises an aggregation of a large number of porous semi-rigid globules which are pressed together in a manner to define a multiplicity of electrolyte channels. By virtue of these channels, the electrolytic solution can diffuse throughout the porous carbon structure and contact the cathodic particles of the structure.

While carbon current collector cathode structures as described hereinabove can be constructed and successfully employed within electrochemical cells, they nonetheless are subject to numerous possible problems and disadvantages. More particularly, the preformed porous carbon structures are inherently fragile and susceptible to breaking or falling apart when a twisted metal cathode current collector is inserted into the preformed carbon structure, either by twisting or forcing the metal cathode current collector longitudinally into the preformed carbon structure. In addition, the impressing of the twisted current collector into the carbon structure cannot be controlled with great accuracy, especially in positioning and guiding the current collector into and along the center of the carbon structure. As a result, the mechanical and electrical contact between the twisted metal cathode current collector and the preformed carbon structure may be inadequate to satisfy the stringent requirements and specifications of the electrochemical cell in which such structure is to be used.

Carbon current collector cathode structures of alternative design are described in U.S. Pat. No. 4,154,906. The carbon current collector cathode structures disclosed in this patent comprise two or more elongated arcuate carbon bodies mechanically biased outwardly by means of a metal member positioned intermediate to, or embedded within, the carbon bodies. The metal member may variously take the form of a coil disposed within an axial opening between the carbon bodies or physically embedded within the carbon bodies, a U-shaped spring strip disposed between or embedded within the carbon bodies and having a protruding end thereof welded to a cover of the cell, or a U-shaped spring strip embedded within the carbon bodies and having the central portion thereof welded to a cover of the cell.

The various carbon current collector cathode structures as described in U.S. Pat. No. 4,154,906 generally have the disadvantage of being difficult to manufacture, especially embedding the metal members within carbon bodies, and are further difficult to assemble without subjecting the carbon bodies to damage, as by breaking and falling apart.

BRIEF SUMMARY OF THE INVENTION

In accordance with the present invention, a carbon cathode structure is provided for an electrochemical cell which avoids the problems and disadvantages associated with prior art carbon cathode structures as described hereinabove. The carbon cathode structure in accordance with the invention generally comprises an elongated porous carbon element and a unitary metal current collector element embedded within the porous carbon element. The porous carbon element has a guide opening provided therein which extends along the element for a portion of its entire length. The unitary metal current collector element comprises first and second elongated, spaced-apart, tapered, resilient spring members joined together at first ends thereby to define a tapered central opening therebetween and a generally V-shaped, tapered form for the current collector member. The first and second spring members lie along and within the guide opening in the porous carbon element and have portions at the tapered joined ends of the first and second spring members physically inserted within the material of the carbon element and extending beyond the termination of the guide opening. The first and second spring members operate when embedded within the carbon element to exert an outwardly directed force against internal portions of the carbon element.

The carbon cathode structure as described hereinabove may be used with other components to form an electrochemical cell. These additional components include an elongated housing for the cell, an electrode in direct contact with the housing, a porous separator in direct contact with the electrode, and an electrolytic solution. The elongated porous carbon element of the carbon cathode structure, when used in the cell, is in direct contact with the porous separator, and the unitary metal current collector element of the carbon cathode structure has the same form and is embedded within the porous carbon element in the same manner as described hereinabove.

BRIEF DESCRIPTION OF THE DRAWING

Various objects, features and advantages of an electrochemical cell including a carbon cathode structure in accordance with the present invention will be apparent from a detailed discussion taken in conjunction with the accompanying drawing in which.

DETAILED DESCRIPTION OF THE INVENTION

Figure 1:
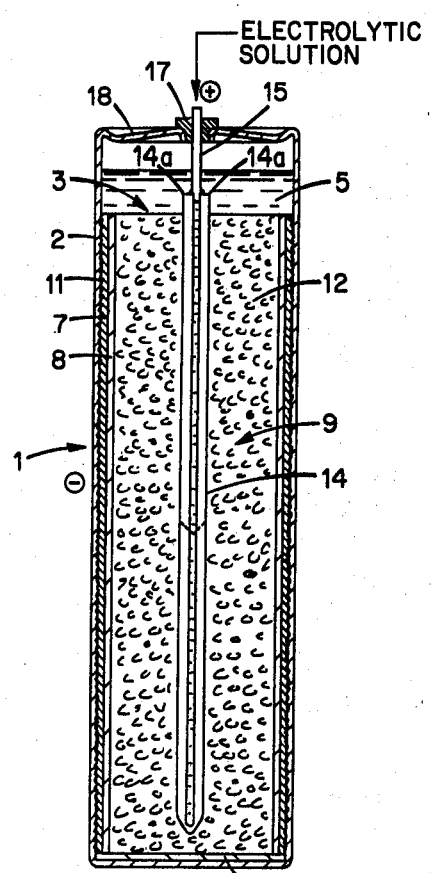
FIG. 1 is an elevational view, partly in cross section, of a primary electrochemical cell employing a carbon cathode structure in accordance with the present invention.

Referring now to FIG. 1, there is shown a primary electrochemical cell 1 in accordance with the present invention. As shown in FIG. 1, the electrochemical cell 1 generally includes an elongated metal casing or housing 2, for example, of a cylindrical configuration, within which a battery stack 3 is disposed. An electrolytic solution 5, for example, in the form of a cathodelectrolyte solution, is provided within the interior of the cell 1 to permeate various portions of the battery stack 3, in a manner to be described in detail hereinafter. A suitable and preferred form of the electrolytic solution 5 which is usable with the components of the battery stack 3 (a preferred form of which will be described in detail hereinafter) is a cathodelectrolyte solution including a reducible soluble cathode, such as thionyl chloride, and an electrolyte solute, such as lithium tetrachloroaluminate, dissolved in the thionyl chloride.

The battery stack 3 and the electrolytic solution 5 as discussed hereinabove collectively represent the electrochemical system of the cell 1. The battery stack 3 in accordance with the invention and as shown in FIG. 1 is insulated from the housing 2 of the cell 1 by a suitable insulator 6 and generally includes a concentric arrangement of an anode 7, a thin porous separator 8, and a cathode current collector electrode structure 9. The anode 7, which takes the form of a cylindrical sheet and which may be of an oxidizable active alkali metal such as lithium, is connected mechanically and electrically to the housing 2 by means of a fine metal screen or grid 11 which is spot welded to the interior wall of the housing 2 and into which the lithium anode is physically pressed to secure the lithium anode to the screen 11. The electrical connection of the anode 7 to the housing 2 establishes the housing 2, which may be of stainless steel, as the negative terminal for the cell.

The aforementioned porous separator 8 is employed to electrically isolate the anode 7 from the cathode current collector electrode structure 9 and typically takes the form of a cylindrical sheet of a standard electrically-nonconductive material such as fiberglass.

The aforementioned cathode current collector electrode structure 9 in accordance with the invention generally comprises a preformed elongated cylindrical porous carbon element 12, and an elongated, generally V-shaped, pointed, tapered metal current collector element 14 embedded within and along the porous carbon element 12. The current collector element 14 is connected at free ends 14a thereof to a cylindrical, hollow, metal feedthrough member 15 spotwelded to the ends 14a of the current collector member 14 and passing through a standard insulative glass or ceramic-to-metal seal 17 provided within an hermetically sealed cap or cover 18 of the cell 1. The free end of the member 15 serves as a positive terminal of the cell 1.

Figure 2:
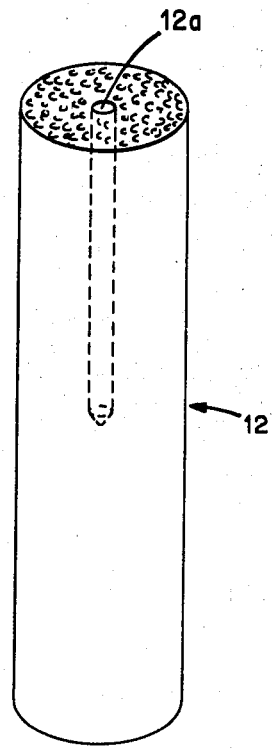
FIGS. 2 and 3 are perspective views, respectively, of a carbon element and a metal current collector element employed by the carbon cathode structure in accordance with the present invention.

The porous carbon element 12, when used with the aforementioned components and specific materials of the cell, acts as a cathode current collector and as a catalyst where the reduction of the solvent (thionyl chloride) in the cathodelectrolyte solution takes place. The carbon element 12, a preferred form of which is shown in FIG. 2, has an opening 12a of circular cross section located centrally therein and extending into the element 12 for a major portion of its length, for example, about half way. The opening 12a in the element 12 serves as a guide for the current collector element 14 for insuring the proper location and centering of the current collector element 14 within the carbon element 12, as will be discussed in greater detail hereinafter. The element 12 is produced by first extruding an aggregation of discrete, semi-rigid, porous carbon conglomerates into a solid cylindrical tube of the desired length, for example, 1½ inch for a "D" sized cell, and then forming the opening 12a therein of the desired length, for example, ¾ inch. The opening 12a may be formed in the carbon element 12 in any desired fashion, for example, by piercing the carbon element with a pointed metal pin. A suitable diameter for the carbon element 12 is 0.4 inch, and a suitable diameter for the opening 12a is up to 0.06 inch.

The conglomerates of the element 12 as described hereinabove generally contain a combination of carbon black, graphite, and a binder such as "Teflon". By virtue of the porous nature of the above ingredients when compressed together, a network of electrolyte-conducting channels are established throughout the carbon element 12 whereby the carbon element 12 can be permeated by the electrolytic solution. Techniques for producing the conglomerates employed by the carbon element 12 are described in detail in U.S. Pat. No. 4,161,063 to which reference may be made for specific details.

Figure 3:
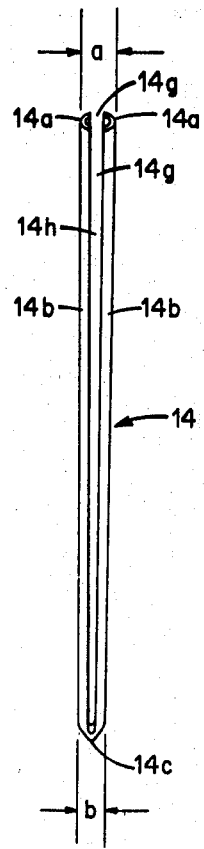
Figure 4:
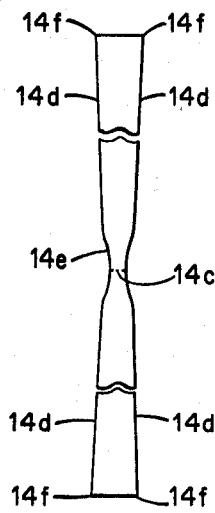
FIG. 4 illustrates a flat metal blank form which the current collector element of FIG. 3 may be formed.

The metal current collector element 14 employed with the carbon element 12 as discussed hereinabove takes the specific form as shown in FIG. 3. As shown in FIG. 3, the current collector element 14, which may be of nickel or stainless steel, is a unitary structure including first and second elongated, generally curved members or portions 14b joined at first ends thereof along a central bend line 14c. The current collector element 14 may be formed from a generally hourglass-shaped, flat metal blank as shown in FIG. 4 having pairs of opposing side edges 14d tapering toward the center of the blank and having a centrally-located necked-down portion 14e. To form the current collector element 14 from the blank, the blank is bent at the bend line 14c and the corners of the blank, shown at 14f in FIG. 4, are bent toward each other, together with the sides of the blank, to form the generally arcuate or curved portions 14b of the current collector element 14. The portions 14b are spaced from each other by gaps or spaces 14g and jointly serve to define a tapered central opening 14h of a generally conical configuration as indicated in FIG. 3. By virtue of the tapered side edges 14d and the necked-down central portion 14e of the blank, the current collector element 14 itself assumes a final tapered form or profile and has a sharp, pointed edge at the bend line 14c. Typical top and bottom dimensions for the current collector element 14, shown at "a" and "b" in FIG. 3, are 0.125 inch and 0.100 inch, respectively, and a typical length for the element 14 is approximately 1.5 inch.

In order to use the current collector element 14 as described hereinabove within the cell 1, the current collector element 14 is first welded at its free ends 14a to the metal feedthrough member 15. This welding operation, which may be a single step operation, serves to produce a rigid assembly together with the metal feedthrough member 15 and the cap or cover 18 (including the seal 17). Before the current collector element 14 is assembled into the cell, the carbon element 12, the porous separator 8 and the anode 7 (in the grid 11) are assembled with respect to each other in a concentric fashion and positioned within the housing 2 of the cell on top of the insulator 6. The current collector element 14 is then inserted into the central guide opening 12a in the carbon element 12 and, using the cover 18 as a pushing member, pushed along and beyond the termination of the opening 12a until the current collector element 14 has been completely embedded within the carbon element 12. As the current collector element 14 is pushed beyond the end of the opening 12a in the carbon element 12, the sharp, pointed terminating edge of the current collector element 14, together with the tapered nature of the element 14, acts as a wedge and pushes aside the conglomerates of the carbon element 12. At the same time, the current collector element 14, by virtue of its resilient nature and its dimensioning relative to the opening 12a in the carbon element 12, provides a permanent outwardly-directed spring effect or force for establishing a tight physical fit between the element 14 and the carbon element 12 and the various other internal components of the cell. When the electrolytic solution 5 is added to the cell, specifically, by way of the hollow feedthrough member 15, the tapered central opening 14h and the gaps 14g of the current collector element 14 permit the electrolytic solution to permeate and saturate the carbon element 12, by way of the aforedescribed electrolyte conducting channels formed within the element 12, and also to permeate the porous separator 8. In addition, the electrolytic solution causes the carbon element 12 to expand outwardly, or swell (by up to 20 percent), thereby resulting in a solid, compact battery stack 3 within the cell 1. Further, by virtue of the electrolyte channels in the element 12, the electrolytic solution is able to penetrate the carbon element 12 and contact interior cathodic particles, thereby providing substantial active surface areas for increasing the rate capability and cell discharge capacity of the cell 1.

Details relative to the method of assembly of the battery stack 3, including the assembly of the cathode current collector electrode structure 9, are disclosed and claimed in the aforementioned co-pending application Ser. No. 286,217.

While there has been described what is considered to be a preferred embodiment of the invention, it will be apparent to those skilled in the art that various changes and modifications may be made therein without departing from the invention as called for in the appended claims.

What is claimed is:

1. A carbon cathode structure for an electrochemical cell, comprising:
   an elongated porous carbon element having a guide opening extending therealong for a portion of its entire length; and
   a unitary metal current collector element embedded within the porous carbon element, said metal current collector element comprising first and second elongated, spaced-apart, tapered, resilient spring members joined together at first ends thereby to define a tapered central opening therebetween and a generally V-shaped, tapered form for the current collector member, said first and second spring members lying along and within the guide opening in the porous carbon element and having portions at the tapered joined ends of the first and second spring members physically inserted within the material of the carbon element and extending beyond the termination of the guide opening in the carbon element, said first and second spring members being operative when embedded within the carbon element to exert an outwardly directed force against internal portions of the carbon element.

2. A carbon cathode structure in accordance with claim 1 wherein:
   the first and second spring members are generally arcuate members defining a generally conical central opening therebetween.

3. A carbon cathode structure in accordance with claim 2 wherein:
   the guide opening in the porous carbon element is generally circular in cross section and located centrally within the carbon element and extends along the carbon element for about one half the length of the carbon element.

4. A carbon cathode structure in accordance with claim 1 wherein:
   the first and second spring members having a pair of spaced-apart ends opposing the joined-together ends; and
   said carbon cathode structure further comprises:
      a feedthrough member having first and second ends, said first end being secured to the spaced-apart ends of the first and second spring members; and
      a cover secured to the second end of the feedthrough member.

5. A carbon cathode structure in accordance with claim 4 wherein:
   the porous carbon element comprises a compressed aggregation of semi-rigid porous carbon conglomerates;
   the first and second spring members are generally arcuate members defining a generally conical central opening therebetween; and
   the guide opening in the porous carbon element is generally circular in cross section and located centrally within the carbon element and extends along the carbon element for about one half the length of the carbon element.

6. An electrochemical cell comprising:
   an elongated housing; and
   an electrochemical system contained within the housing, said electrochemical system comprising:
      an electrolytic solution; and
      a battery stack exposed to said electrolytic solution, said battery stack comprising:
         an electrode in direct contact with the housing;
         a porous separator in direct contact with the electrode;
         an elongated porous carbon element in direct contact with the porous separator and having a predetermined length and having a guide opening extending therealong for a portion of its entire length; and
         a unitary metal current collector element embedded within the porous carbon element, said metal current collector element comprising first and second elongated, spaced-apart, tapered, resilient spring members joined together at first ends thereby to define a tapered central opening therebetween and a generally V-shaped, tapered form for the current collector member, said first and second spring members lying along and within the guide opening in the porous carbon element and having portions at the tapered joined ends of the first and second spring members physically inserted within the material of the carbon element and extending beyond the termination of the guide opening in the carbon element, said first and second spring members being operative when embedded within the carbon element to exert an outwardly directed force against internal portions of the carbon element.

7. An electrochemical cell in accordance with claim 6 wherein:
the first and second spring members are generally arcuate members defining a generally conical central opening therebetween for the receipt therein of electrolytic solution.

8. An electrochemical cell in accordance with claim 6 wherein:
the guide opening in the porous carbon element is generally circular in cross section and located centrally within the carbon element and extends along the carbon element for about one half the length of the carbon element.

9. An electrochemical cell in accordance with claim 6 wherein:
the first and second spring members have a pair of spaced-apart ends opposing the joined-together ends; and
said carbon cathode structure further comprises:
a feedthrough member having first and second ends, said first end being secured to the spaced-apart ends of the first and second spring members; and
a cover secured to the second end of the feedthrough member.

10. An electrochemical cell in accordance with claim 9 wherein:
the porous carbon element comprises a compressed aggregation of semi-rigid porous carbon conglomerates;
the first and second spring members are generally arcuate members defining a generally conical central opening therebetween; and
the guide opening in the porous carbon element is generally circular in cross section and located centrally within the carbon element and extends along the carbon element for about one half the length of the carbon element.

11. An electrochemical cell in accordance with claim 10 wherein:
the electrode in contact with the housing and the separator are generally cylindrical in configuration and are arranged concentrically with each other and with the porous carbon element.

12. An electrochemical cell in accordance with claim 11 wherein:
the electrode in contact with the housing is an anode structure including an oxidizable alkali metal; and
the electrolytic solution includes a reducible soluble cathode and an electrolyte solute dissolved in the soluble cathode.

13. An electrochemical cell in accordance with claim 12 wherein:
the oxidizable alkali metal of the anode structure is lithium;
the reducible soluble cathode of the electrolytic solution is thionyl chloride; and
the electrolyte solute of the electrolytic solution is lithium tetrachloroaluminate.

* * * * *